G. A. STENSON.
STATION OR STREET INDICATOR.
APPLICATION FILED JULY 28, 1916.

1,234,815.

Patented July 31, 1917.
2 SHEETS—SHEET 1.

Inventor
Gustaf Adolph Stenson,
By Victor J. Evans
Attorney

Witnesses
C. F. Rudolph
F. Hough

G. A. STENSON.
STATION OR STREET INDICATOR.
APPLICATION FILED JULY 28, 1916.
1,234,815.
Patented July 31, 1917.
2 SHEETS—SHEET 2.
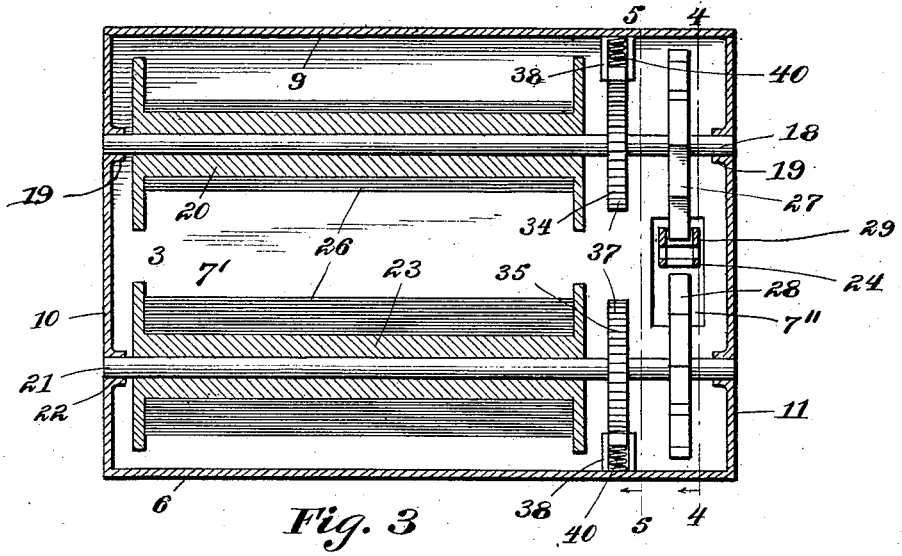
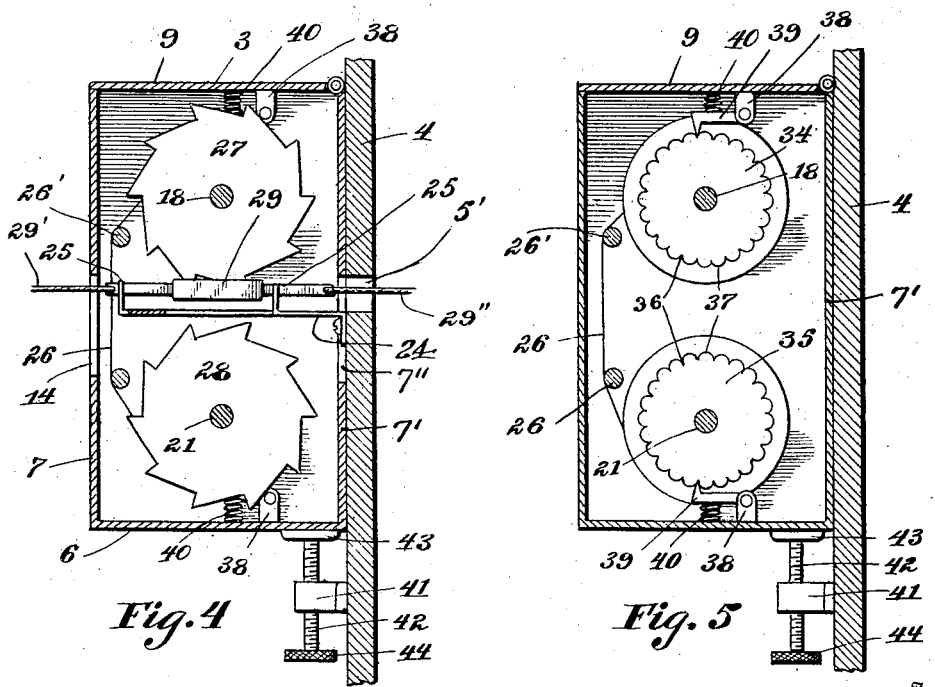
Inventor
Gustaf Adolph Stenson,
By Victor J. Evans
Attorney
Witnesses
C. F. Rudolph
F. Hoyt

UNITED STATES PATENT OFFICE.

GUSTAF ADOLPH STENSON, OF COKATO, MINNESOTA.

STATION OR STREET INDICATOR.

1,234,815. Specification of Letters Patent. Patented July 31, 1917.

Application filed July 28, 1916. Serial No. 111,880.

*To all whom it may concern:*

Be it known that I, GUSTAF ADOLPH STENSON, a citizen of the United States, residing at Cokato, in the county of Wright and State of Minnesota, have invented new and useful Improvements in Station or Street Indicators, of which the following is a specification.

This invention relates to a station or street indicator and particularly to an indicator which is especially adapted for use upon street and railroad cars to enable the passengers thereon to determine the next station or street at which the car will stop.

The primary object of the invention is to provide a station or street indicator of the class described in which the indicator may be operated through the medium of a flexible member passing through the indicator and arranged within the car in which the indicator is installed so that when several cars are connected to form a train, the ends of the flexible members may be connected to enable the indicators in all of the cars to be simultaneously operated from one end of the train.

Another object of the invention is to provide an indicator of the class described in which an indicator casing connected with a support has arranged therein an indicating tape provided with designating characters and terminally connected with winding drums having associated therewith ratchet wheels between which is arranged a guide member connected with said support and having arranged therein a link for engagement with said ratchet wheels and slidable in the guide member under the influence of a flexible indicator operating member to cause the drum associated with the ratchet wheel with which the link is engaged to turn and wind the indicating tape thereon.

A further object of the invention is to provide an indicator of the class described in which the casing having arranged therein a link connected with the flexible indicator operating member for engagement with the ratchet wheels associated with the drums upon which is wound the indicating tape is adjustably connected with a support so that when the casing is moved vertically upon the support, the link may be brought into engagement with either of the ratchet wheels to enable the tape to be wound upon either of the drums as the occasion may require.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications within the scope of the claims may be resorted to when desired.

Like characters of reference denote corresponding parts in the several views in the drawing, in which:

Fig. 3 is a vertical transverse sectional view on the line 3—3 of Fig. 1.

Fig. 4 is a vertical transverse sectional view on the line 4—4 of Fig. 3.

Fig. 5 is a view similar to Fig. 4 taken on the line 5—5 of Fig. 3.

Figure 1:
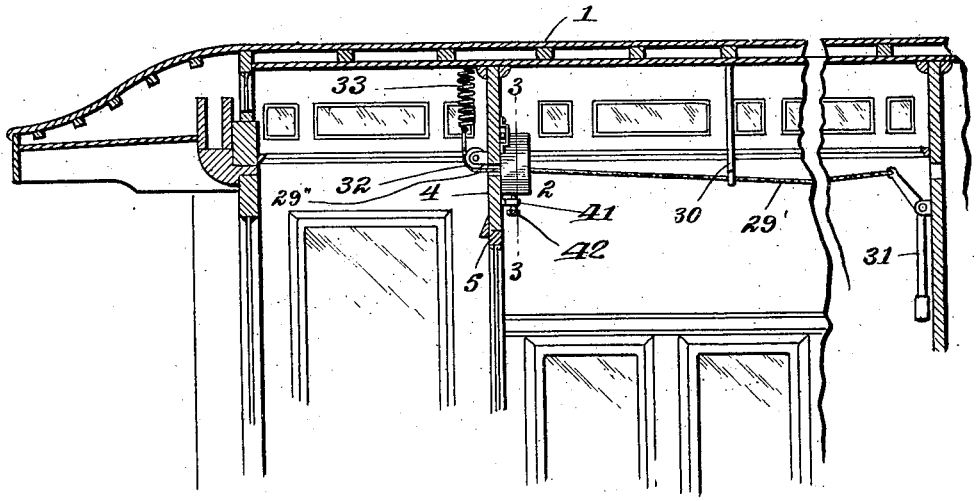
Figure 1 is a vertical longitudinal sectional view through the upper portion of a car showing the improved station or street indicator applied thereto.
Figure 2:
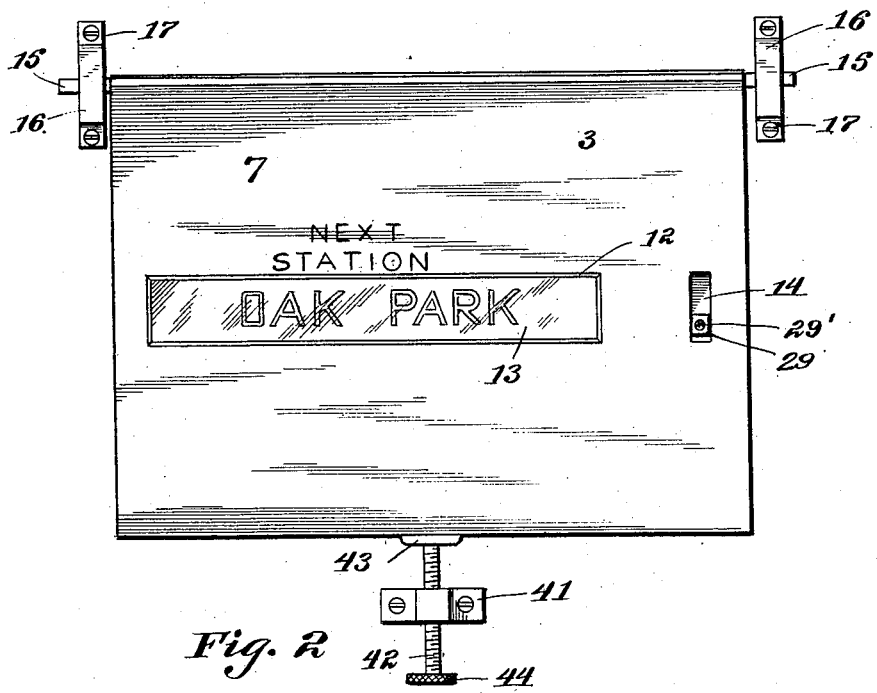
Fig. 2 is a view in elevation upon an enlarged scale of the station or street indicator and showing the same connected with a support.

Referring now to the drawings in detail, the numeral 1 designates the upper portion of a car of the type now in common use upon street railways and has arranged interiorly thereof the improved station or street indicator 2 having an indicator casing 3 movably connected with an end wall 4 of the car above the door 5 therein, said end walls being provided with an opening 5'.

The indicator casing 3 which is formed from any suitable material such as sheet metal, or the like, comprises a bottom 6, front and rear walls 7 and 7', a hinged top 9, and end walls 10 and 11, said rear wall 7' having formed therein a slot 7'' registering with the opening 5' in the end wall 4.

The front wall 7 of the indicator casing has formed therein a transversely extending and elongated observation opening 12 closed by a glass panel 13 and alining with a slot 14 in said front wall adjacent the end wall 11, said slot 14 also being in alinement with the slot 7'' in the rear wall 7' in the indicator casing.

Each of the end walls 10 and 11 has extending laterally therefrom adjacent the hinged cover 9 an arm 15 underlying an offset portion 16 in a clip 17 terminally connected with the end wall 4 of the car 1.

Through the above described manner of connecting the indicator casing 3 with the end wall of the car, it will be seen that the indicator casing may be moved vertically upon the end wall 4 of the car and that the offset portions in the clips 17 through which are passed the arms 15 on the indicator casing limit the upward movement of the casing in a vertical direction.

A shaft 18 is arranged within the indicator casing 3 above the observation opening 12 therein and has its ends mounted to turn in bearings 19 on the end walls 10 and 11, said shaft having mounted thereon a winding drum 20.

A second shaft 21 is arranged within the indicator casing 3 below the observation opening 12 and has its ends mounted to turn in bearings 22 formed on the end walls 10 and 11 of the indicator casing, said shaft having mounted thereon a winding drum 23 alining with the winding drum 20 on the shaft 18.

Arranged within the indicator casing 3 between the shafts 18 and 21 is a bracket 24 one end of which is received in the slot 7' in the rear wall of the indicator casing and connected with the end wall 4 of the car below the opening 5' therein, said bracket being provided with a plurality of spaced guide fingers 25.

An indicating tape 26 which is provided throughout its length with spaced and transversely extending rows of designating characters is arranged within the indicator casing 3 and is terminally connected with the drums 20 and 23 with the portion of the tape between the drums held in close proximity to the observation opening 12 in said casing by spaced rollers 26' mounted to turn in the end walls of the indicator casing.

Through the above described manner of connecting the indicating tape 26 with the winding drums 20 and 23, it will be seen that when one of the shafts 18 or 21 is turned to cause the tape to be wound on the drum associated therewith the designating characters on the tape will be successively brought into registration with the observation opening 12 in the indicator casing 3.

The shaft 18 has mounted thereon between one end of the drum 20 and the end wall of the indicator casing 3 a ratchet wheel 27 alining with a ratchet wheel 28 on the shaft 21 below the observation opening 12 in the indicator casing.

A link 29 for operating the ratchet wheels 27 and 28 is slidably mounted between the guide fingers 25 on the bracket 24 and has connected with one end an indicator operating cord 29' which extends longitudinally of the car 1 and is connected with the ceiling thereof by hangers 30, said cord having one end thereof connected with an operating lever 31 pivotally mounted upon one end of the car 1 and arranged within convenient reach of the train crew, so that when the lever 31 is turned about its pivotal connection with the end wall of the car, the link 29 will be drawn toward the front wall of the indicator casing 3 by the cord 29'.

A section of cord 29" is connected with the other end of the ratchet wheel operating link 29 and passes through the opening in the rear wall of the indicator casing and through the opening in the end wall of the car, said cord section also passing between pulleys 32 connected with the end wall of the car and has its other end connected with a contractile spring 33 secured to the roof of the car 1.

Through the above described manner of arranging the indicator operating cord 29, it will be seen that when the cord is pulled in one direction by the lever 31 the ratchet wheel which is in engagement with the link 29 will be turned by said link to cause the indicating tape to be wound on the winding drum with which said ratchet wheel is associated and that upon the release of the lever 31 the spring 33 will restore the link 29 to its normal position.

Mounted on the shaft 18 between the ratchet wheel 27 and winding drum 20 is a wheel 34 alining with a similar wheel 35 on the shaft 21, said wheels 34 and 35 having their peripheral surface indented, as at 36, to provide teeth 37.

Mounted on the hinged top 9 and bottom 6 of the indicator casing 3 are brackets 38 with each of which is pivotally connected a dog 39, said dogs being held in contact with the wheels 34 and 35 by springs 40, so that the wheels 34 and 35 and dogs 39 co-act in preventing turning movement of the winding drums 20 and 23 when the ratchet wheel operating link 29 is restored to normal position by the spring 33.

A bracket 41 is secured to the end wall 4 of the car beneath the indicator casing 3 and has adjustably mounted therein a stem 42 one end of which is swivelly connected with a bar 43 forming a support for the indicator casing 3, the other end of the stem being provided with an operating head 44 by means of which the stem 42 may be adjusted in the bracket 41 to cause the bar 43 to move the casing in a vertical direction upon the end wall 4 of the car so that one of the ratchet wheels 27 or 28 may be brought into the path of movement of the ratchet wheel operating link 29 thus enabling the indicating tape 26 to be wound upon either of the winding drums 20 or 23 as the occasion requires.

When the improved station or street indicator is connected with and arranged in a car as shown in Fig. 1 in the drawing and the ratchet wheel 27 is arranged in the path of movement of the ratchet wheel operating link 29 and it is desired to move the row of designating characters on the indicating tape 26 which is below the observation opening 12 in the casing 3 into registration with said opening the lever 31 is turned about its pivotal connection with the end of the car to cause the ratchet wheel operating link 29 to turn the ratchet wheel 27 until the desired row of designating characters on the tape 26 is brought into registration with the observation opening 12 in the casing 3, at which time the lever 31 is released so that the spring 33 may restore the link 29 to its normal position.

It will, of course, be understood that the action of the ratchet wheel operating link 29 on the ratchet wheel 27 causes the teeth on the wheels 34 and 35 to raise the dogs 39 against the influence of the springs 40 so that the tape may be unwound from the drum 23 and wound upon the drum 20 as the shaft 18 is turned by the wheel 27.

After the indicating tape 26 has been wound upon the winding drum 20 in the manner described until the last row of designating characters thereon is brought into registration with the observation opening in the casing 3 and it is desired to rewind the tape on the winding drum 23 as the return trip of the car is made, the indicator casing 3 is adjusted vertically on the end wall 4 of the car through the medium of the bar 43 and stem 42 until the ratchet wheel 28 is arranged in the path of the ratchet wheel operating link 29.

With the ratchet wheel 28 arranged in the path of movement of the ratchet wheel operating link 29, it will be seen that the indicating tape 26 will be unwound from the winding drum 20 and wound upon the winding drum 23 as the rows of designating characters thereon are successively brought into registration with the observation opening in the indicator casing 3 through the operation of the lever 31.

While only one car has been shown in the drawings equipped with the improved station or street indicator, it will, of course, be understood that where several cars are connected to form a train with each car equipped with an indicator, the indicator operating cords 29' may be connected so that when the indicator operating cord lever 31 at the rear of the train is pulled, the indicators will be simultaneously operated and that when the said lever is released the spring 33 arranged in the car at the front of the train and connected with the indicator operating cords will restore the ratchet wheel operating links 29 in all of the indicators to their normal position.

From the foregoing description, taken in connection with the accompanying drawing, it is at once apparent that a station or street indicator has been provided which though simple in construction and inexpensive of manufacture, is highly efficient in use.

Having thus described the invention, what is claimed as new, is:

1. In a station or street indicator, the combination with a support, of an indicator casing adjustably mounted on said support, an indicating tape within the indicator casing, winding mechanism arranged within the casing and connected with the indicating tape, and an operating member for said winding mechanism passing through said indicator casing and connected with said support.

2. In a station or street indicator, the combination with a support, of an indicator casing slidably mounted on said support, winding mechanism arranged within said indicator casing, an indicating tape terminally connected with said winding mechanism, a flexible element connected with said support and passing through said indicator casing, and a link connected with said flexible member and engageable with said winding mechanism.

3. In a station or street indicator, the combination with a support, of an indicator casing adjustably mounted on said support, winding mechanism arranged within the casing, a tape terminally connected with said winding mechanism, a bracket connected with said support and arranged within the indicator casing, a link engageable with said winding mechanism and mounted for sliding movement in said bracket, and a flexible element having connection with said support and with said link.

4. In a station or street indicator, the combination with a support, of an indicator casing adjustably mounted on said support, spaced shafts arranged within said indicator casing, winding drums on said shafts, an indicator tape terminally connected with said drums, ratchet wheels on said shafts, a bracket connected with said support and arranged within said casing between said ratchet wheels, a link mounted to slide in said bracket and engageable with said ratchet wheels, and a flexible member having connection with said link and with said support.

5. In a station or street indicator, the combination with a support, of a casing adjustably mounted on said support, spaced shafts within said casing, drums on said shafts, an indicating tape terminally connected with said drums, ratchet wheels on said shafts, a bracket connected with said support and arranged within said casing between said ratchet wheels, a link mounted to slide in said bracket and engageable with said ratchet wheels to impart turning movement thereto, a flexible member connected with said link and with said support for operating the same, and means for limiting the turning movement of said shafts under the influence of said link.

6. In a station or street indicator, the combination with a support, of an indicator casing having arms thereon, clips connecting said arms with said support, indicating mechanism arranged within the indicator casing, means for operating said indicating mechanism, a bracket connected with said support and arranged below the indicator casing, a stem adjustably mounted in said bracket, a bar swivelly connected with said stem and contacting with the indicator casing, and an operating head on said stem.

In testimony whereof I affix my signature.

GUSTAF ADOLPH STENSON.

Copies of this patent may be obtained for five cents each, by addressing the "Commissioner of Patents, Washington, D. C."